Aug. 9, 1966    R. J. LANE ETAL    3,264,822
NOZZLES FOR DISCHARGE OF COMPRESSIBLE FLUID
Filed Nov. 21, 1963    4 Sheets-Sheet 2

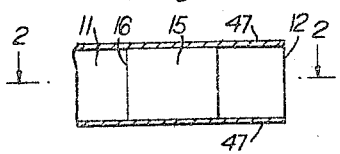
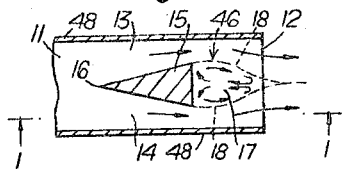
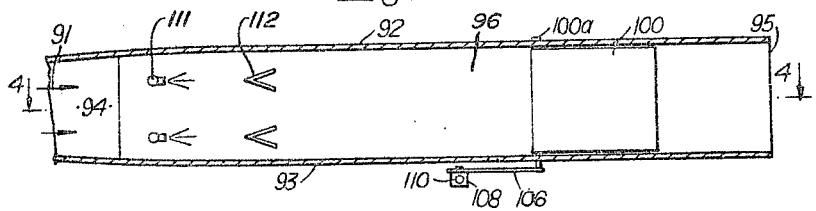
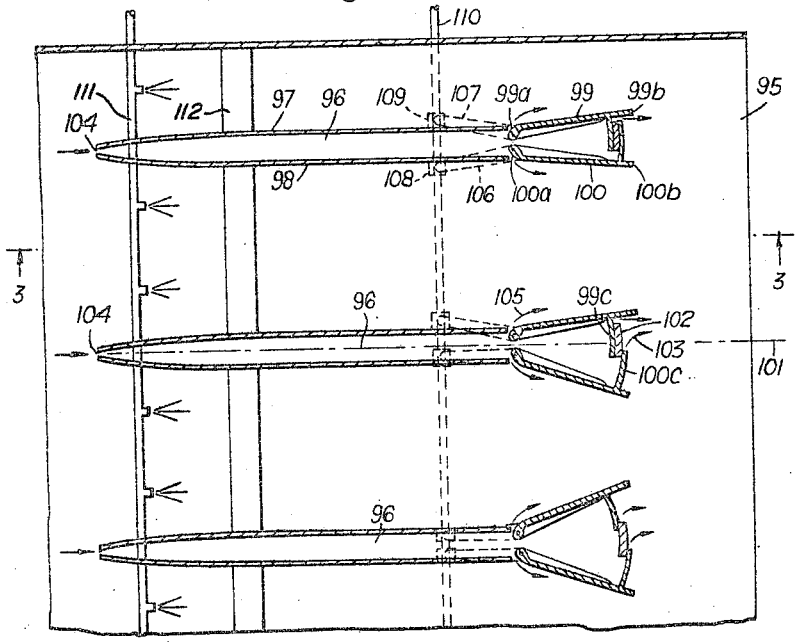

Inventor
RAYMOND JOHN LANE
TERENCE ROY DENIS FOOTE
By Bailey, Stephens
Hueltig    Attorneys

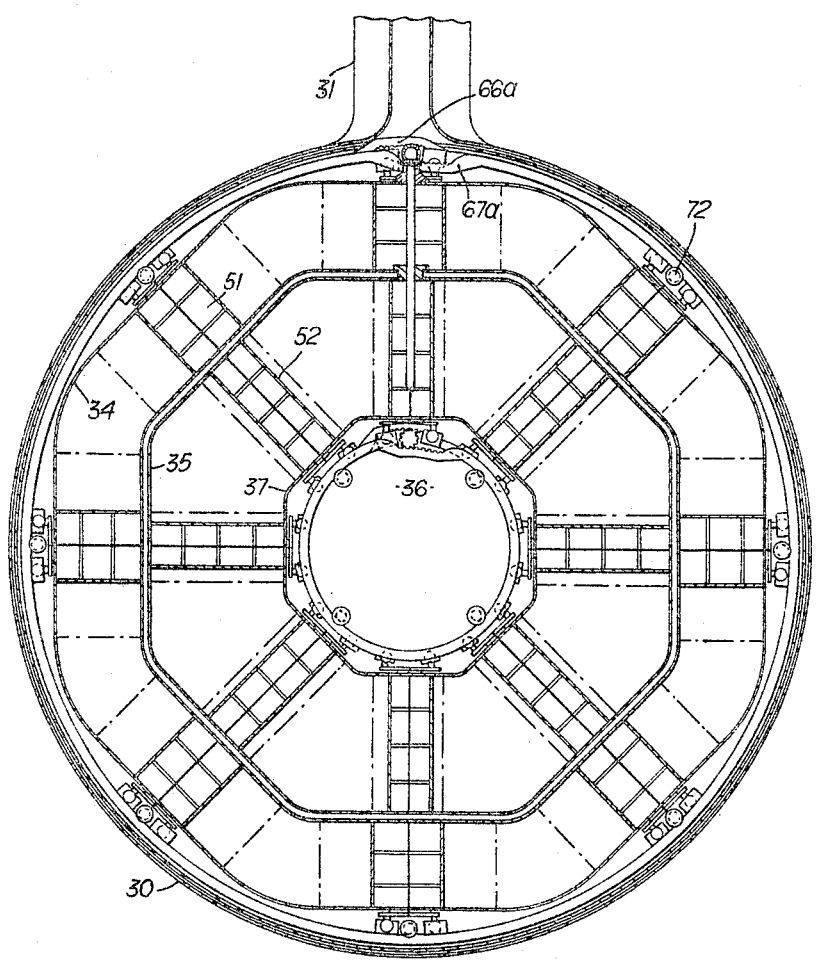

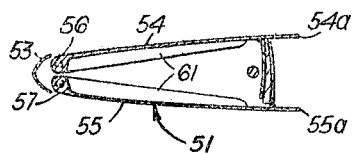
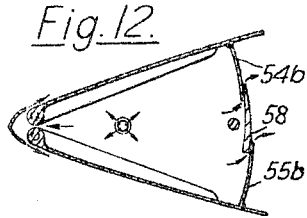
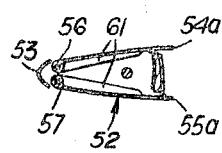
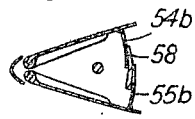
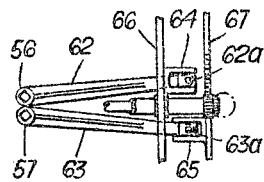
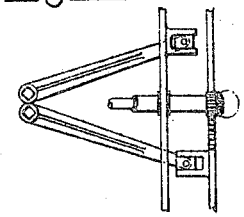

United States Patent Office 3,264,822
Patented August 9, 1966

3,264,822
NOZZLES FOR DISCHARGE OF COMPRESSIBLE FLUID
Raymond John Lane and Terence Roy Denis Foote, Bristol, England, assignors to Bristol Siddeley Engines Limited, Bristol, England, a British company
Filed Nov. 21, 1963, Ser. No. 325,420
Claims priority, application Great Britain, Nov. 26, 1962, 40,605/62
14 Claims. (Cl. 60—35.6)

This invention relates to nozzles for the discharge of compressible fluids into an ambient atmosphere at velocities, relative to the nozzle structure, in excess of the local speed of sound in the fluid flow (Mach 1). Such nozzles are used in power plants of aircraft.

According to this invention, a discharge nozzle comprises an outer wall enclosing a duct with an open discharge end, and at least one vane which projects into the duct from the outer wall; each vane having two flanks each terminating downstream at a trailing edge spaced upstream from the open discharge end of the duct, and a base defined between the two trailing edges and facing in the downstream direction; with means for substantially closing the base even during variations of the distance between the trailing edges.

When the nozzle is operated at a suitable pressure ratio, streams of fluid break away from the vane at the trailing edges, and portions of the streams form a circulatory flow system in a region bounded by the base and by part of the outer wall between the open discharge end of the duct and the trailing edges, the system having a static pressure higher than ambient atmospheric pressure. This static pressure exerts a forward thrust on the base of the vane, and hence on the nozzle. This action will be explained below in more detail with reference to FIGURES 1 and 2 of the accompanying drawings.

There are three principal arrangements of nozzle to which the invention may be applied. In the first, each vane extends across the duct from the outer wall on one side of the duct to the outer wall on the opposite side of the duct. In the second, there is a centre body defining, with the outer wall, a duct of annular section, and there are a plurality of vanes extending radially from the outer wall to the centre body. In the third, there is an intermediate wall defining with the outer wall an outer duct of annular section, and a centre body defining with the intermediate wall an inner duct of annular section, and there are an outer set of a plurality of vanes extending radially from the outer wall to the intermediate wall and an inner set of a plurality of vanes extending radially from the intermediate wall to the centre body.

The invention is of particular value where it is desired to adjust the throat area of the nozzle of an aircraft power plant to suit different conditions of flight. For this purpose, the trailing edges of each vane may be on parts movable relatively to one another to vary the width of the base. Preferably each vane includes a base wall comprising a plurality of overlapping parts.

In applying the invention to a nozzle with the third arrangement mentioned above, that is to say concentric annular outer and inner ducts, mechanism may be provided by which the width of the bases of the outer set of vanes and the width of the bases of the inner set of vanes are adjustable independently. A nozzle with such mechanism is relatively simple in construction as compared with other forms of nozzle with concentric annular ducts and means for independent adjustment of the throat areas of the ducts.

Preferably each vane has a narrow leading edge, and the flanks of the vanes are convex outwards. Alternatively the vanes may be blunt-nosed.

The trailing edges should provide a definite boundary to the flanks, at which the streams of fluid will break away. Preferably the whole base of each vane lies forward of the trailing edges of that vane.

The accompanying drawings show examples of nozzles according to the present invention. In these drawings:

FIGURES 1 and 2 show, in longitudinal sections in planes at right angles to one another, the general dynamic mode of operation of a rectangular section nozzle including one wedge-shaped vane, FIGURE 2 corresponding to the line 2—2 in FIGURE 1, and FIGURE 1 to the line 1—1 in FIGURE 2;

FIGURES 3 and 4 are two longitudinal sections in planes at right angles through a downstream portion of a ramjet duct of elongated rectangular cross-section, FIGURE 3 corresponding to the line 3—3 in FIGURE 4 and FIGURE 4 to the line 4—4 in FIGURE 3;

FIGURE 9 is a transverse section taken at the line 9—9 on FIGURE 8;

FIGURE 10 is a section through an adjustable vane in the outer annular duct, corresponding to the line 10—10 in FIGURE 8, the vane being closed to its minimum base width configuration;

FIGURE 11 is a similar section through an adjustable vane in the inner annular duct, corresponding to the line 11—11 in FIGURE 8;

Figure 5:
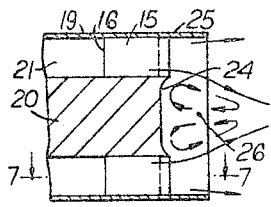
FIGURES 5 and 6 show somewhat schematically in longitudinal section and rear end view respectively an annular duct nozzle including eight vanes.

FIGURES 12 and 13 show the vanes of FIGURES 10 and 11 opened to their maximum base width configurations; and FIGURES 14 and 15 are views of the mechanism for operating the outer set of vanes, the figures showing the mechanism in its vane-closed and vane-open settings respectively.

The nozzle shown in FIGURES 1 and 2 comprises a gas duct 11 with an open discharge end 12. The duct is divided into two separate exit passages 13 and 14 by a wedge-shaped vane 15 which extends across the duct. The apex 16 of the vane is upstream so that the exit passages 13 and 14 are convergent downstream and discharge into a region 46 of sudden enlargement of total duct cross-section immediately downstream of the vane. To obstruct flow between the ambient atmosphere and the region 46, the duct wall is continued a substantial distance downstream beyond the rear end of the vane, as parts 47 and 48.

In operation, a circulatory flow at a pressure above that of the ambient atmosphere is established in the space 17 behind the vane. The boundaries 18 between this space and the gas streams from the passages 13 and 14 constitute virtual divergent nozzle walls whereby the discharged gas is accelerated to a velocity in excess of Mach 1. The pressure of the gas in the space 17 acting forwards on the base of the vane 15 approximates to the forward thrust which would be developed on corresponding actual divergent nozzle walls. Those parts 47 of the extended duct wall which divide the space 17 from the ambient atmosphere prevent flow of gas along the length of the vane, and thus prevent loss of this thrust. In addition, those parts 48 of the extended duct wall which divide the main gas streams in the region 46 from the ambient atmosphere prevent outward expansion of these streams, which if freely permitted would result in a loss of thrust.

FIGURES 3 and 4 show how several vanes may be arranged side by side in a duct of oblong cross-section. Air flows through the duct in the direction indicated by arrows 91, a first part of the upper and lower walls 92 and 93 being divergent and constituting a subsonic diffuser 94. The remainder of the duct is substantially parallel-sided, and has an open discharge end 95. The duct is divided into a number of bays by vanes 96 which extend from a leading edge near the end of the diffuser section to trailing edges spaced upstream from the open discharge end 95. Three such vanes are shown in FIGURE 4, but the number may be increased according to the required width of the duct. The bay between a vane and the side wall is half the width of each bay between two vanes.

The vanes are hollow and are composed of two fixed flank members 97 and 98 and two trailing edge flank members 99 and 100 which are mounted at their upstream ends on shafts 99a and 100a the ends of which are journalled in the upper and lower walls of the duct. The flank members 99 and 100 terminate at trailing edges 99b and 100b which define between them a base the width of which is variable by turning the members about their shaft centres. In FIGURE 4 the vanes above a plane 101 are shown adjusted to their minimum base width settings, and those below the plane 101 are shown adjusted to their maximum base width settings. The downstream ends of the vanes are closed by a base wall consisting of a fixed central part 102 and two cylindrical wall parts 99c and 100c attached to the flank members 99 and 100. These three parts overlap with a small working clearance through which cooling air discharges as indicated by arrows 103. The cooling air enters the vanes from the diffuser 94 through slots 104 in the leading edges of the vanes. Some cooling air is also discharged through small gaps between the fixed and adjustable flank members as indicated by arrows 105.

Adjustment of the base width of the vanes is effected through mechanism comprising operating levers 106 and 107 attached to the lower ends of the shafts 99a and 100a outside the duct, the free ends of the levers being moved by nuts 108 and 109 with threads of opposite hand, running on a shaft 110.

The parts of the duct lying between the vanes constitute combustion chambers for fuel introduced through a distributing system 111, suitable flame holding equipment, shown conventionally as gutters 112, being provided.

In operation, the trailing edge flank members 99 and 100 of adjacent vanes define convergent nozzles, the throat area of which is adjustable by rotation of the shaft 110. When the system is operated with a suitable pressure ratio across the nozzles, the streams of combustion products breaking away from the flanks of each vane at their trailing edges expand and flow together at a position upstream of the open end 95 of the duct. Fluid from these streams forms circulatory systems, at a static pressure higher than that of the ambient atmosphere, in regions bounded in part by the bases of the vanes and in part by that portion of the duct walls extending downstream of the vanes, so that forward thrust is produced on the bases of the vanes.

Other arrangements are possible in which the vanes do not extend completely across the duct. In particular, the duct may be of circular cross section with vanes extending radially inwards, and terminating so as to leave a clear passage in the centre of the duct. The vanes may be of decreasing width towards the axis of the duct. However, if a circular duct is required, it is preferable for it to be annular in cross section.

Figure 6:
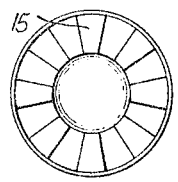
Figure 7:
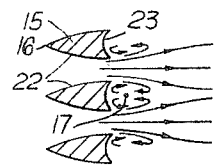
FIGURE 7 is a developed sectional view through three of the vanes corresponding to the line 7—7 in FIGURE 5.
Figure 8:
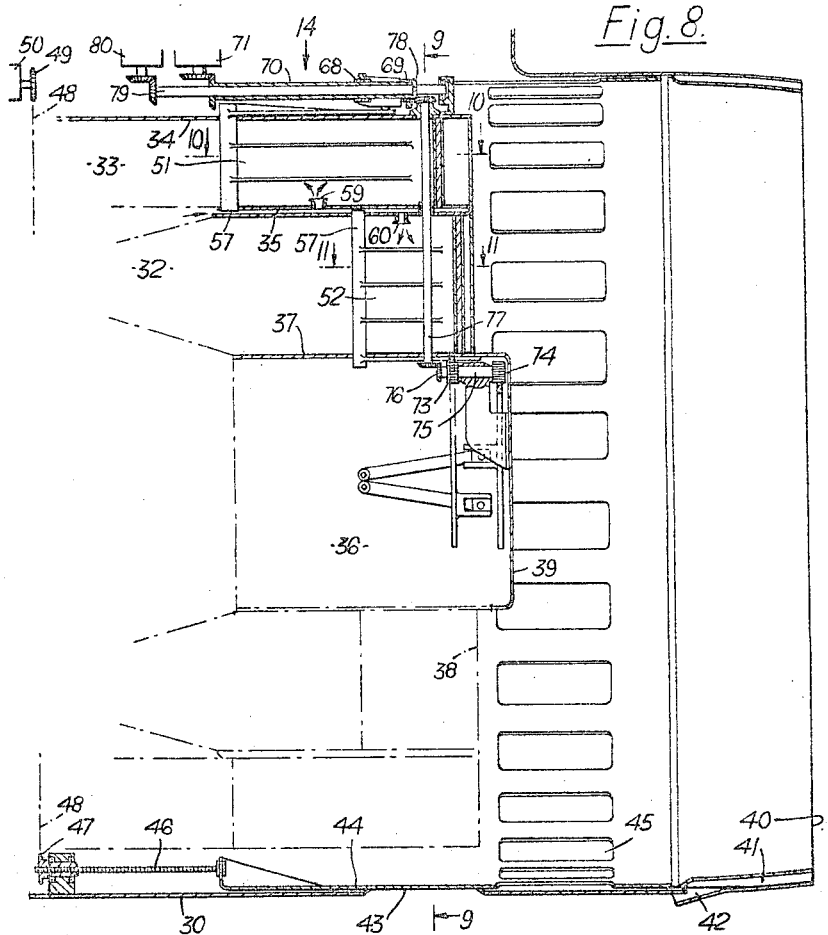
FIGURE 8 is a longitudinal section through a nozzle suitable for use with a by-pass jet engine discharging through concentric annular ducts.

FIGURES 5, 6 and 7 illustrate a nozzle comprising a cylindrical outer wall 19 and a centre body 20 defining an annular duct 21. Eight wedge-shaped vanes 15 extend radially across the duct at equal intervals with their apices 16 upstream. As shown in FIGURE 7, the flanks 22 of the vanes are made somewhat convex and the bases 23 somewhat concave. The centre body 20 also ends in a somewhat concave curved base 24, which is enclosed by the trailing edge of the peripheral surface of the centre body, and which is near to the plane of the trailing edges of the vanes.

In operation at pressure ratios producing a pressure at the outlets of the passages between the vanes, in excess of the ambient atmospheric pressure, circulatory flow at a pressure above that of the ambient atmosphere is formed in spaces 17 behind the vanes, flow between the atmosphere and these regions being obstructed by an annular extension 25 of the outer wall beyond the downstream ends of the vanes. A further circulatory flow with a pressure above atmospheric is formed in the space 26 downstream of the centre body.

FIGURES 8 to 15 show how the invention may be applied to a nozzle with two concentric annular ducts. The nozzle is used in conjunction with a by-pass jet engine. The jet engine is housed in a pod 30 supported by a strut 31 and has an inner annular passage 32 through which the turbine exhaust gas flows into the nozzle, and an outer annular passage 33 through which air by-passing the turbine section flows into the nozzle. Only the rear ends of these passages are shown. Upstream of the part shown, the passage 33 is provided with combustion equipment for heating the by-passed air.

The nozzle structure includes an outer wall 34 of octagonal shape in transverse sections, with the corners rounded, a hollow intermediate wall 35 of corresponding shape, and a centre body 36 having an outer skin 37 also of corresponding shape. The outer and intermediate walls terminate in the downstream direction at a transverse plane 38, while the centre body 36 terminates in a flat base end 39 a short distance downstream of this plane. The skin of the pod 30 surrounds and is spaced from the outer wall 34 and acts as a further part of the outer wall. It extends downstream of the plane 38 and terminates at an open discharge end 40. A terminal part 41 of this extension is slightly convergent and of double-walled construction, a series of airscoops 42 being provided to direct cooling air into the hollow interior at its forward end, and the rear end being open to allow this air to escape. Upstream of the plane 38, the pod skin 30 is provided with a ring of openings 43 for admission of atmospheric air, and there is an internal sleeve 44 with corresponding openings 45 which may be moved forwards from the position shown in FIGURE 8, in which it closes the openings 43, to a position in which the openings 43 and 45 are in register with one another. The annular space between the pod skin 30 and the main outer wall 34 is closed by a diaphragm at some convenient position forward of the nozzle so that the admitted air flows rearwards, and when the openings are closed a pressure above the static atmospheric pressure can build up in this space.

The sleeve 44 is operated by a plurality of ball-screw jacks 46 spaced around the periphery of the pod skin 30, each jack having a sprocket 47 engaging an endless chain 48 which also passes round a sprocket 49 on the shaft of an actuating motor 50 mounted in the strut 31.

Centered on radial planes through the middles of the flat parts of the walls 34, 35 and 37, one of which is in line with the strut 31, are eight vanes 51 crossing the outer annular passage 33 and a similar number of vanes 52 crossing the inner annular passage 32. The vanes of the two sets are of similar construction but different cross-sectional size, as may be seen from FIGURES 10 and 11. Each vane comprises a fixed leading edge part 53 and a pair of flank members 54 and 55 which are mounted at their forward ends on shafts 56 and 57 journalled in bearings carried by the walls of the passage in which they are situated. The flank members 54 and 55 terminate in the downstream direction in trailing edges 54a and 55a which define a base the width of which is varied as the trailing edges move towards and away from one another by pivoting of the flank members around the shaft centres. Each vane includes a base wall consisting of three overlapping parts, namely a fixed centre part 58 and two cylindrical parts 54b and 55b carried by the flank members 54 and 55 respectively. These overlapping parts have small clearances between them through which compressed air admitted to the interiors of the vanes through openings 59 and 60 in the intermediate wall 35 for cooling purposes can escape. Some of the cooling air also escapes through gaps between the leading edge part 53 and the flank members 54 and 55, as shown by small arrows in FIGURE 12. The cooling air is admitted into the intermediate wall structure from a compressor of the engine at a position upstream of the nozzle and not shown in the drawings. The flank members of the vanes are slightly convex outwards and are stiffened by ribs 61.

As shown in FIGURES 14 and 15, the outer vanes 51 are adjusted each by a pair of levers 62 and 63 attached to ends of the shafts 56 and 57 projecting outwards through the outer wall 34. At their free ends the levers 62 and 63 carry blocks 62a and 63a sliding in forks 64 and 65 carried by two rings 66 and 67 encircling the outer wall. The rings are of the same diameter except in the region of the strut 31, where they separate inwards and outwards and are provided with rack teeth 66a and 67a engaging pinions 68 and 69 on a hollow shaft 70 driven by an actuating motor 71. Rotation of the shaft 70 turns the rings 66 and 67 in opposite directions and thus opens or closes the vanes. At each of the other vane positions the rings 66 and 67 are supported by rollers 72.

The inner vanes 52 are operated by similar mechanism housed in the centre body 36. The pinions 73 and 74 of this mechanism are on a shaft 75 which is driven through bevel gears 76 by a shaft 77 extending radially outwards through the inner vane and outer vane in the plane of the strut 31, the shaft 77 in turn being driven, through bevel gears 78 and a shaft 79 extending through the hollow shaft 70, by an actuating motor 80.

By reason of the substantially polygonal transverse section of each duct wall, and of the centre body, with the number of sides of each polygon being equal to one another and equal to the number of vanes in each set, the inner and outer edges of the movable parts of each vane are able to make a sliding seal with the corresponding flat faces of the duct walls or centre body throughout their range of movement.

In operation, the vane actuating motors 71 and 80 are controlled in response to suitable engine-operation parameters to vary independently the throat area of the outer duct of the nozzle through which the by-pass air is discharged from the engine to atmosphere, and the throat area of the inner duct of the nozzle through which the turbine exhaust gases of the engine are discharged. The motor 71 may for example be controlled as a function of pressure rise between the engine air intake and the by-pass duct 33, and the motor 80 as a function of pressure drop across the turbines. When the nozzle is operated at a suitable pressure ratio, with the air admission openings 43 closed, the streams of working fluid breaking away from the flanks of the vanes at their trailing edges expand and flow together at a position upstream of the open end 40 of the outer casing 30. Fluid from these streams forms circulatory systems in regions downstream of the vanes, bounded in part by the bases of the vanes and in part by the outer casing 30. If the pressure ratio is sufficient, the static pressure in these regions will be in excess of the ambient static pressure, and forward thrust will be developed on the bases. As the pressure ratio is reduced, the static pressure in the circulatory regions will fall below the ambient static pressure; this is a situation corresponding to over-expansion of the working fluid. To prevent this over-expansion, air is admitted through the openings 43 by operating the motor 50 to move the sleeve 44 rearwards. The motor may for example be controlled by a device sensing the difference between the ambient static pressure and the static pressure sensed at a suitable position downstream of the base of one of the vanes.

We claim:
1. A nozzle for the discharge of a compressible fluid into an ambient atmosphere, comprising an outer wall enclosing a duct with an open discharge end, and at least one vane which projects into the duct from the outer wall; each vane having two flanks each terminating downstream at a trailing edge spaced upstream from the open discharge end of the duct, and a base wall lying between the two trailing edges and facing in the downstream direction; the trailing edges being on members which are movable relatively to one another to vary the distance apart of the trailing edges, and the base wall including expandable and contractible means operable in coordination with the relative movement of the members for substantially closing the space between the trailing edges and the vanes; the system having a static pressure higher than ambient atmospheric pressure.

2. A nozzle according to claim 1 in which the base wall comprises a plurality of overlapping parts.

3. A nozzle according to claim 1 in which each vane has a narrow leading edge, and the flanks of the vane are convex outwards.

4. A nozzle according to claim 3 in which the whole base wall of each vane lies forward of the trailing edges of that vane.

5. A nozzle according to claim 1 in which the outer duct wall has an opening permitting entry of ambient atmosphere in each region of circulatory flow, and closure means for the opening.

6. A nozzle according to claim 1 including a first outer wall part terminating at a transverse plane, a plurality of vanes extending into the duct from the first outer wall part and having their trailing edges in the said transverse plane, a second outer wall part surrounding and spaced from the first outer wall part and extending downstream from the said transverse plane to an open discharge end, and valve means operable to permit and prevent a flow of fluid rearwards between the first and second outer wall parts and through the said transverse plane.

7. A nozzle according to claim 1 in which each vane extends across the duct from the outer wall on one side of the duct to the outer wall on the opposite side of the duct.

8. A nozzle according to claim 1 in which there is a centre body defining, with the outer wall, a duct of annular section, and there are a plurality of vanes extending radially from the outer wall to the centre body.

9. A nozzle according to claim 8 in which the trailing edges of the vanes are in a common plane, and the centre body has a peripheral surface terminating downstream at a trailing edge enclosing a base which is near that plane.

10. A nozzle according to claim 1 in which there is an intermediate wall defining with the outer wall an outer duct of annular section, and a centre body defining with the intermediate wall an inner duct of annular section, and there is an outer set of a plurality of vanes extending radially from the outer wall to the intermediate wall and an inner set of a plurality of vanes extending radially from the intermediate wall to the centre body.

11. A nozzle according to claim 10 including mechanism by which the width of the base walls of the outer set of vanes and the width of the base walls of the inner set of vanes are adjustable independently.

12. A nozzle according to claim 11 in which a transmission member for adjusting the width of the base walls of the inner set of vanes extends through vanes of the outer and inner sets which are in alignment with one another on opposite sides of the intermediate wall.

13. A nozzle according to claim 10 in which the centre body and each duct wall are substantially polygonal in transverse section, the number of sides of each polygon being equal to one another and equal to the number of vanes in each set.

14. A nozzle according to claim 1 in which the whole base wall of each vane lies forward of the trailing edges of that vane.

References Cited by the Examiner

UNITED STATES PATENTS

| | | | |
|---|---|---|---|
| 2,848,867 | 8/1958 | Hausmann | 60—35.6 |
| 2,944,765 | 7/1960 | Lane | 60—35.6 |
| 3,055,174 | 9/1962 | Grotz | 60—35.6 |

MARK NEWMAN, *Primary Examiner.*

RALPH D. BLAKESLEE, *Examiner.*